J. KING.
LOG HANDLING DEVICE.
APPLICATION FILED NOV. 29, 1919.
1,364,383.
Patented Jan. 4, 1921.
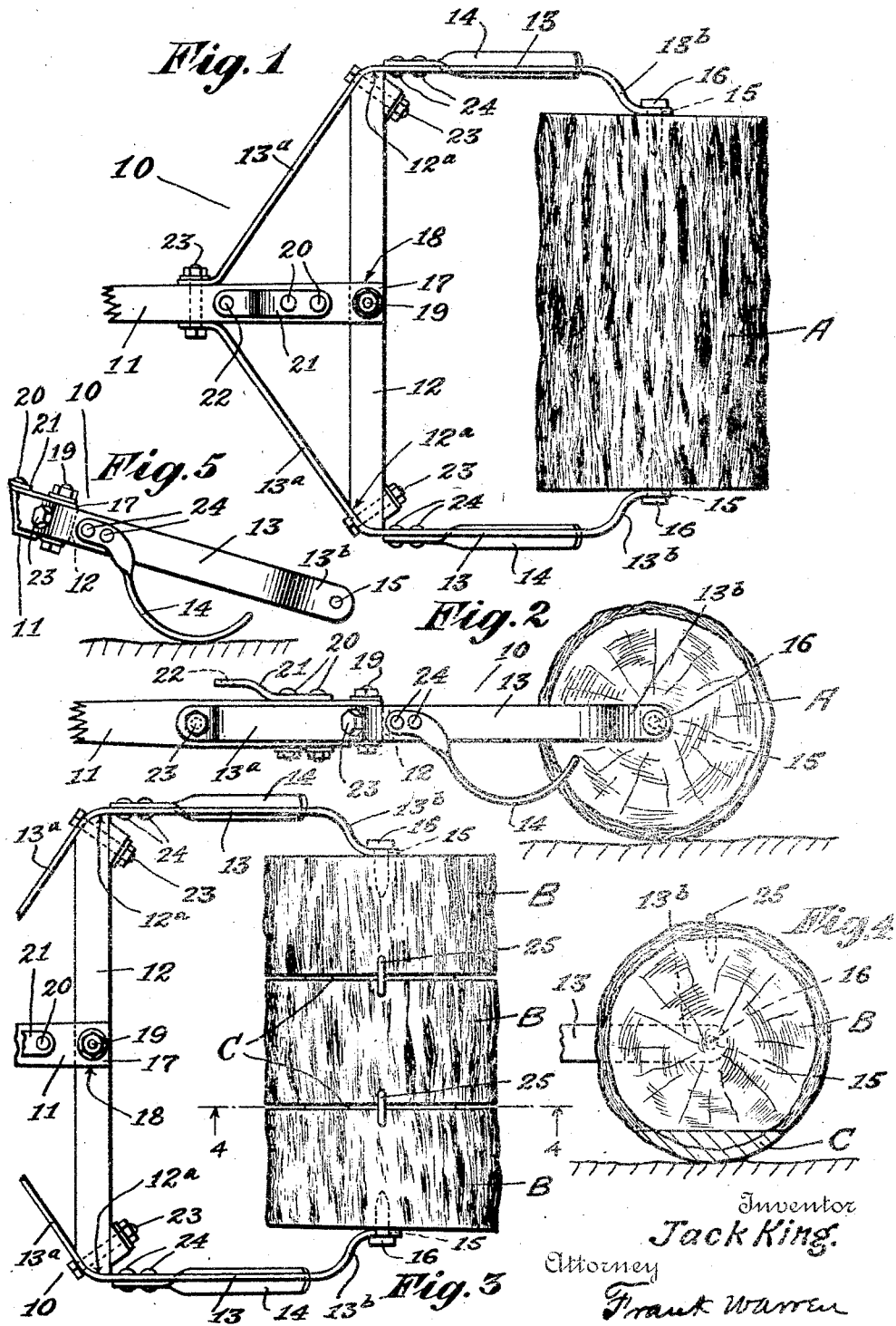

UNITED STATES PATENT OFFICE.

JACK KING, OF SEATTLE, WASHINGTON.

LOG-HANDLING DEVICE.

1,364,383.  Specification of Letters Patent.  Patented Jan. 4, 1921.

Application filed November 29, 1919. Serial No. 341,550.

*To all whom it may concern:*

Be it known that I, JACK KING, a citizen of the United States, residing at Seattle, in the county of King and State of Washington, have invented a certain new and useful Improvements in Log-Handling Devices, of which the following is a specification.

My invention relates to improvements in log handling devices and the object of my improvement is to provide a device for transporting short lengths of logs or bulky pieces of unshaped timber from the source of supply to the mill thus eliminating the necessity for the usual skid roads, trails and hauling machinery.

A further object of my invention is to provide a device wherein the short lengths of logs or other bulky pieces of unshaped timber are rotatably mounted to function as rollers to facilitate the transportation thereof.

A still further object of my invention is to provide a device having skids mounted therein to facilitate its return to the source of supply.

A still further object of my invention is to provide a device that is adapted to be horse or tractor drawn, a tractor being used when it is desired to transport a number of short lengths of logs or other bulky pieces of timber at one time.

A still further object of my invention is to provide a device wherein the short lengths of logs or bulky pieces of timber may be quickly attached to or detached from the device.

A still further object of my invention is to provide a device that is simple in its plan of construction, efficient in operation and one that may be manufactured at a very low cost.

With the above and other objects in view which will appear as the description proceeds, my invention resides in the novel construction and combination and arrangement of parts hereinafter described and claimed.

I accomplish these objects by devices illustrated in the accompanying drawings, wherein—

Figure 1 is a top plan view of a device embodying the features of my invention illustrating a log mounted for transportation therein.

Fig. 2 is a view in side elevation of the same;

Fig. 3 is a fragmentary top plan view of my device illustrating a plurality of pieces of unshaped timber mounted for transportation thereon;

Fig. 4 is a view in transverse section taken on line 4, 4 of Fig. 3; and

Fig. 5 is a fragmentary view in side elevation illustrating the aforesaid device disposed on its runners or skid members.

Referring to the drawings, throughout which like reference numerals indicate like parts, the numeral 10 indicates the frame of my device comprising a pole or tongue 11, a cross member or brace 12 fixedly secured to the said pole and disposed perpendicular to the latter, side bars 13 disposed on each side of the pole 11 and fixedly secured to the said pole 11 and said brace 12, runners or skid members 14 fixedly secured to the side bars 13, suitable apertures 15 provided in the side bars 13 adjacent the rear ends thereof and pins 16 disposed in said apertures 15 adapted to receive a log for rotation in the said frame.

The pole 11, which is shown in the accompanying drawings as having its forward end broken off, is formed on its rear end with a tenoned portion 17 the latter being adapted to seat in a mortise 18 cut in the brace 12 substantially in the center thereof, said pole 11 being fixedly secured to the brace 12 by a bolt 19.

Fixedly secured by the bolts 20 to the upper side of the pole 11 and contiguous to the rear end thereof is a strap 21 suitably formed and adapted to receive a double tree or the like, arranged to be interposed between the said strap 21 and the said pole 11, said strap having a hole 22 formed in its forward end and a similar hole in the pole 11 in axial alinement with the hole 22 for the reception of a pin or bolt to thereby secure the doubletree to the said pole 11.

The forward ends 13$^a$ of the side bars 13 are formed to converge inwardly and are fixedly secured by bolts 23 to the ends 12$^a$ of the cross brace 12 and the sides of the pole 11, the aforesaid ends 12$^a$ of the cross bar 12 being cut to conform to the shape of the inner faces of the side bars 13.

Pins or spikes 16 are adapted to be disposed within the apertures 15 said pins being substantially concentrically secured in the end of a log A when the same is positioned between the rear ends 13$^b$ to thereby provide journals for the said log to permit the free rotation of the latter in said frame.

Fixedly secured by rivets 24 to the outer faces of the side bars 13 are runners or skid members 14 the latter being suitably curved and arranged to contact with the ground when the log A is removed as shown in Fig. 5.

In Figs. 1 and 2 I have shown a short length of a log A such as a piece of cord wood or a shingle bolt disposed for rotation and transportation in the frame 10.

In Figs. 3 and 4 I have shown a plurality of rick wood sections B disposed for rotation and transportation in said frame 10.

In transporting rick wood I have found it the best practice when cutting the logs into lengths adaptable to be interposed in the frame 10 to also cut the said lengths into a plurality of rick wood sections B, the said cuts extending substantially through the major portion of the diameter of the log A thereby leaving an integral portion C between each section to secure the said sections against separation during the transportation of the same.

To further insure against separation of the various sections during the transportation of the same, I provide staples 25 adapted to straddle the cuts and to be driven into the section at a point approximately diametrically opposite the integral portions C.

If it is desired the aforesaid cuts may extend across the diameter of the log and the rick wood sections B secured to each other by a plurality of staples 25 for the transportation of said sections in the said frame 10.

In the operation of the device, a log A of predetermined length or a unit of rick wood sections B is positioned in the frame 10 the pins 16 are inserted in the apertures 15 and driven into the ends of the aforesaid log or unit care being taken that said pins are secured to the log substantially in alinement with the axis of the latter. The foregoing operation being completed the device is ready to be hauled away.

To release the log A or the unit of rick wood sections B the pins 16 are extracted from the ends of the aforesaid log or unit to permit the latter to be rolled out.

This operation completed the device is hauled back on the skid members or runners.

Obviously, changes may be made in the forms, dimensions and arrangement of parts of my invention without departing from the spirit thereof.

What I claim is:

In a log hauling device comprising a bifurcated frame, a pole, a cross brace fixedly secured to the said pole and disposed perpendicularly to the latter, side bars disposed on each side of the said pole and adapted to be fixedly secured to the latter and the aforesaid cross brace, skid members fixedly secured to said side bars and pins disposed in said side bars adapted to engage a log for rotation within the aforesaid frame.

In witness whereof, I hereunto subscribe my name this 22nd day of November A. D. 1919.

JACK KING.